(12) United States Patent
Krippgans

(10) Patent No.: US 8,451,106 B2
(45) Date of Patent: May 28, 2013

(54) ANTI THEFT SYSTEM

(75) Inventor: Thomas Krippgans, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 162 days.

(21) Appl. No.: 11/776,144

(22) Filed: Jul. 11, 2007

(65) Prior Publication Data
US 2008/0012731 A1    Jan. 17, 2008

(30) Foreign Application Priority Data
Jul. 11, 2006    (EP) .................................... 06014365

(51) Int. Cl.
*B60R 25/10*    (2006.01)
(52) U.S. Cl.
USPC ............... 340/426.18; 340/426.1; 340/426.2; 340/426.19; 340/988; 455/456.1; 701/32.4
(58) Field of Classification Search
USPC .................... 340/426.2, 425.5, 426.1, 426.18
See application file for complete search history.

(56) References Cited

U.S. PATENT DOCUMENTS

| 6,125,283 A * | 9/2000 | Kolev et al. ................. 455/552.1 |
| 6,198,919 B1 | 3/2001 | Buytaert et al. |
| 7,689,254 B2 * | 3/2010 | Tanneberger et al. ...... 455/569.1 |
| 2004/0201461 A1 * | 10/2004 | Parker et al. ............. 340/426.13 |
| 2005/0130670 A1 * | 6/2005 | Gould et al. ................ 455/456.1 |
| 2006/0082471 A1 * | 4/2006 | Rockett et al. ................ 340/988 |
| 2009/0280870 A1 * | 11/2009 | Muttschall et al. ......... 455/569.2 |

FOREIGN PATENT DOCUMENTS

| FR | 2756083 | 5/1998 |
| WO | WO 01/25927 A1 | 4/2001 |

* cited by examiner

Primary Examiner — Brian Zimmerman
Assistant Examiner — Sara Samson
(74) Attorney, Agent, or Firm — Brinks Hofer Gilson & Lione

(57) ABSTRACT

A method for identifying the position of a stolen vehicle is provided that includes the steps of detecting the start of an engine of the vehicle, retrieving vehicle identification information, establishing a connection to an external database of stolen vehicles, transmitting the retrieved vehicle identification information via a wireless communication system to the database and verifying whether the identified vehicle is in the database of stolen vehicles. If the identified vehicle is in the list of stolen vehicles, the position of the vehicle is then determined.

17 Claims, 3 Drawing Sheets

ANTI THEFT SYSTEM

RELATED APPLICATIONS

This application claims priority of European Patent Application Serial Number 06 014 365.8 filed Jul. 11, 2006, titled ANTI THEFT SYSTEM, which application is incorporated by reference in its entirety in this application.

BACKGROUND OF THE INVENTION

1. Field of the Invention

This invention relates to vehicle anti theft systems and to a method for identifying a stolen vehicle. In particular, the invention relates to a system for tracking a vehicle and alerting the respective authorities in case of a vehicle theft.

2. Related Art

Vehicle theft has become a severe problem in the last years. Often the stolen vehicles are transferred to other countries and, in most of cases, it is not possible to relocate the stolen vehicles. To protect a vehicle from being stolen, different methods and systems exist. By way of example, mechanical security systems exist that help to secure the steering wheel. Additionally, alarm systems are known that emit an alarm sound when the vehicle is stolen and when the alarm is activated. Additionally, security systems are known in which several small radio frequency transceivers are hidden in different places in the vehicle. When a theft is reported to the police, a routine entry into the police crime computer automatically activates the radio frequency transceiver in the vehicle transmitting an audible signal allowing to locate the vehicle. However, in this case, installation of the different radio frequency transmitters in the vehicle is necessary.

Recently, the use of automotive infotainment systems and/or the use of hands free communication systems in vehicles have become popular. These infotainment systems or hands free systems often comprise a network access device allowing to use a mobile telephony network.

In view of the foregoing background there exists a need to provide a vehicle anti theft system that allows the tracking of the vehicle in case of a theft without the need to install additional security systems.

SUMMARY

According to one example of an implementation of the invention, a method is provided for identifying the position of a stolen vehicle. In this example, when a vehicle is started, the start of the engine is detected. The vehicle is then identified by retrieving vehicle identification information. A connection is then made to an external database of stolen vehicles via a wireless communication system and the retrieved vehicle information is transmitted to the external database of stolen vehicles. Utilizing this database, it is verified whether the vehicle is identified in the database of stolen vehicles. If the vehicle is identified as a stolen vehicle, the position of the vehicle may then be determined.

In modern vehicles, the transmission of data to an external database using a wireless communication system is often provided. Thus, this signal path can be used for transmitting a vehicle identification signal every time the vehicle is started. The existing communication modules provided in a vehicle can then be used for determining the position of the vehicle. Accordingly, every time the vehicle is started, the vehicle identification information can be automatically transmitted to an external system via a wireless communication network to verify whether the vehicle is in the database registry of stolen vehicles.

According to another aspect of the invention, a vehicle anti theft system is provided that includes an engine detector for detecting the start of the engine of the vehicle. Furthermore, a mobile communication system including a network access device may be provided for communicating via a wireless communication system to other systems outside the vehicle. A vehicle identification unit is further included that automatically retrieves vehicle identification information when the engine of the vehicle is started and the network access device transmits the vehicle identification information via the wireless communication unit to an external database of stolen vehicles. Furthermore, a position detection unit may be provided that, upon detection that the vehicle is recognized as a stolen vehicle, determines the vehicle position.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
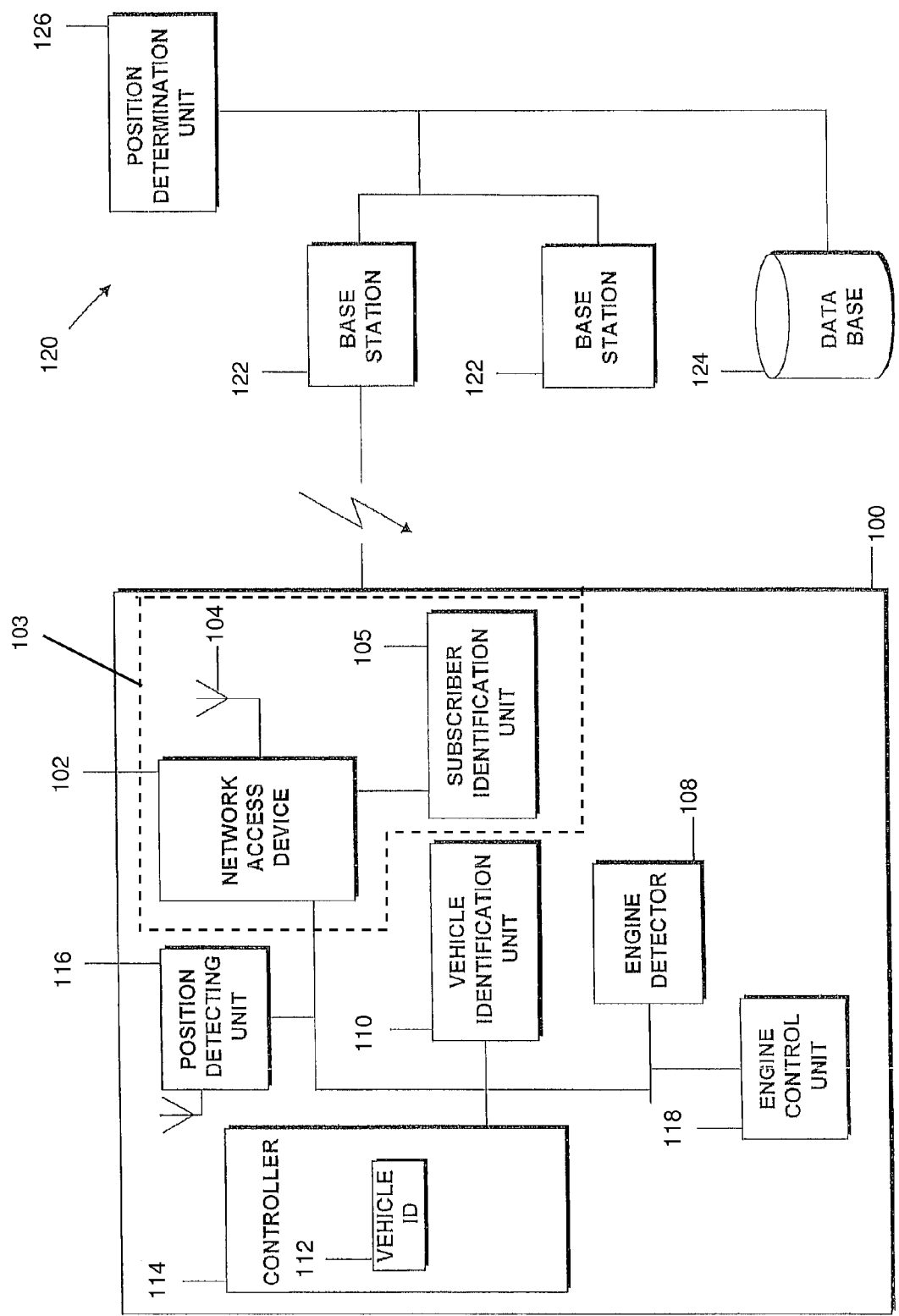
FIG. 1 is a schematic view of one example of an implementation of a vehicle anti theft system of the invention.

Referring to FIG. 1, a vehicle anti theft system according to one example of an implementation of the invention is described. As illustrated in FIG. 1, the vehicle anti theft system may include components positioned in a vehicle 100, the components of which may include a wireless communications system, which in this example is a mobile telephony network.

As illustrated in FIG. 1, in the vehicle 100, a network access device 102 is provided that may be part of a mobile communication unit or system 103, such as a hands free system of the vehicle 100 or part of a cellular phone provided in the vehicle 100. The network access device 102 may be connected to an antenna 104 through which a connection can be established to the mobile network 120, in which the signal of the vehicle 100 is received by base stations 122 of the mobile network 120.

The mobile communication unit 103 to which the network access device 102 belongs may additionally include a subscriber identification unit 105 that may be used to identify the subscriber of the mobile network. Normally, a subscriber identification module card (SIM card) is used in connection with the subscriber identification unit 105. The use of the mobile communication system is normally not possible when the SIM card is not connected to the subscriber identification unit 105. However, the network access device 102 can nevertheless transmit data via the wireless communication system without the knowledge of the identity of the subscriber, e.g., for an emergency cell. Thus, the network access device 102 is able to transmit data to the base stations 122 without the presence of the SIM card.

The anti theft system furthermore comprises an engine detector 108 for detecting the start of the engine of the vehicle 100. In one example of an implementation, when the start of the engine is detected, a process is automatically started where vehicle identification unit 110 retrieves vehicle identification information stored in a memory 112 of a controller 114. This vehicle identification information is then fed to the network access device 102 of the mobile communication unit 103 where the vehicle identification information is transmitted to a base station 122. From the base station 122, the vehicle identification information may then be transmitted to a server 124, including a database containing information pertaining to stolen vehicles. The server 124 may then determine whether the vehicle identification information for the identified vehicle 100 is included in the list of stolen vehicles provided in the database. If the identified vehicle 100 is determined to be a stolen vehicle, in one example of an implementation of the invention, the base station(s) 122 then sends a signal to a position detection unit 116 in the vehicle 100. The position detection unit 116 may then process the signal received from the base station(s) 122 and determine a position of the vehicle 100 from the received signal.

Additionally, according to another implementation, when a navigation system is included in the vehicle 100 it may be possible to use the position information of the navigation system. In this example, the navigation system may include a position detecting unit 116 for detecting the position of the vehicle 100 using signals received by a satellite such as a GPS system and using other driving information of the vehicle 100. Accordingly, if such a navigation system is present in the vehicle 100, the information that the vehicle 100 is a stolen vehicle can be transmitted back to the vehicle 100 where the position detecting unit 116 of the navigation system can be activated, the determined position being continuously transmitted to the mobile network 120. Furthermore, it is possible that, when the information is received in the vehicle 100 that the vehicle 100 is a stolen vehicle, the vehicle 100 continues to transmit the vehicle identification information via the mobile network 120, so that it is also possible to track the vehicle 100 position by extracting the position information from the cell information of the mobile network 120.

Alternative to the use of the position detecting unit 116, in a mobile network 120, the position of a vehicle 100 can be determined when it is known which base station(s) 122 received the signal from the network access device 102 of the vehicle 100. When only one base station 122 receives the signal, the position of the vehicle 100 can be determined in a first approximation as it can be deduced that the vehicle 100 is somewhere in the coverage zone of the base station 122. If the signal is received by several base stations 122, the position of the vehicle 100 can be determined more precisely as with the knowledge of the position of the base stations 122 and, with the knowledge of the signal intensity of the received signal, the position of the mobile communication unit 103 of the vehicle 100 can be determined.

Additionally, an engine control unit 118 may be provided that can be configured in such a way that the engine control unit 118 may control the functioning of the engine of the vehicle 100. When it is determined that the vehicle 100 is registered as a stolen vehicle by the server 124 database, in one example of an implementation of the invention, a signal can be transmitted back to the vehicle 100. The vehicle 100 may then continue transmitting signals to the mobile network 120 so that the position of the vehicle 100 can be continuously determined by the position detection unit 116. Furthermore, the engine control unit 118 may control different functions of the engine depending on the result of the information received from the mobile network 120.

The different components in the vehicle 100 can exchange information between each other using a network provided in the vehicle 100. Those skilled in the art will recognize that the network can be a wired network, such as a MOST bus or CAN bus; however, wireless transmission of adapt is also possible using technologies such as Bluetooth, etc.

Figure 2:
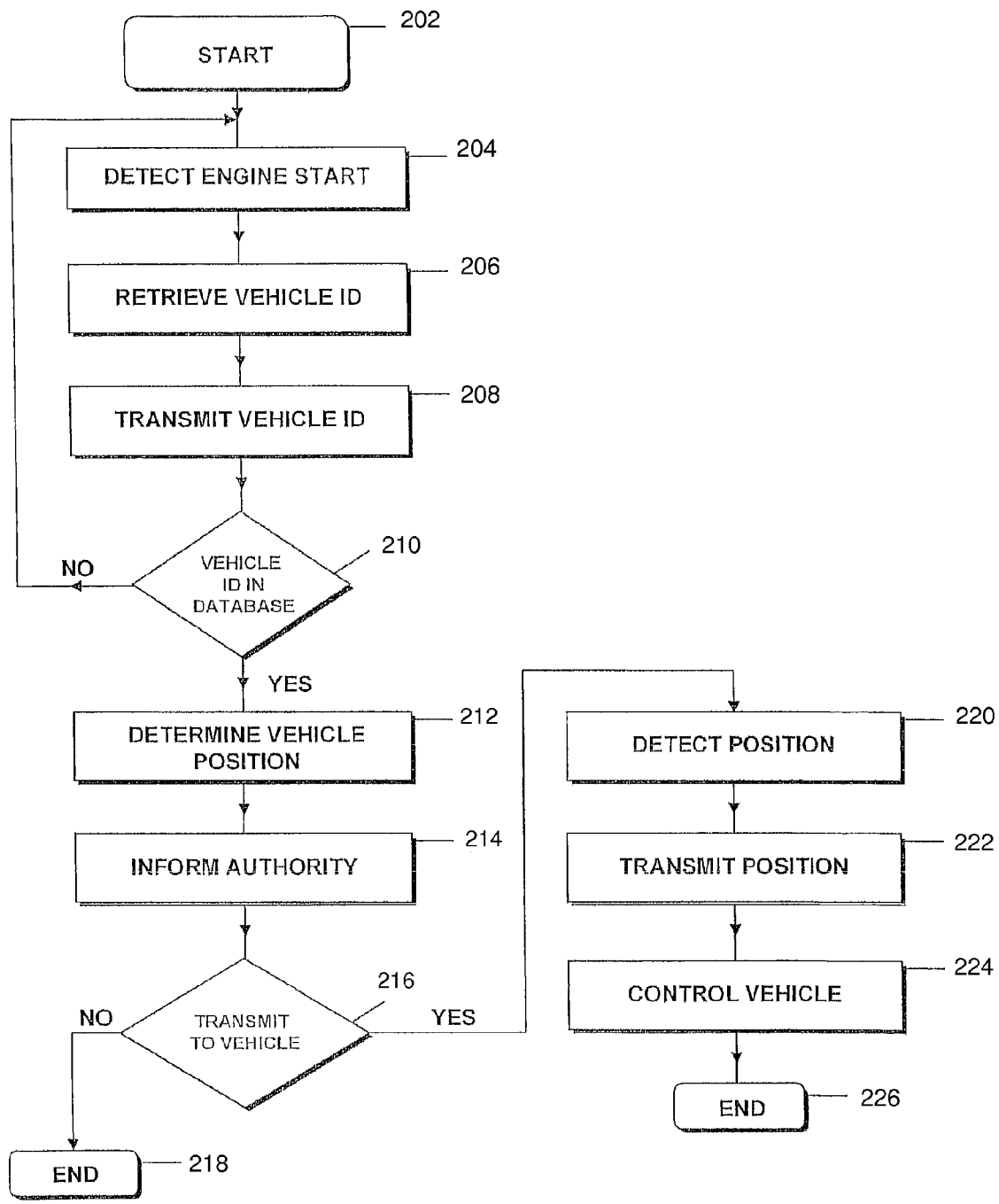
FIG. 2 is a flowchart illustrating one example of an implementation for operating the vehicle anti theft system shown in FIG. 1.

FIG. 2 is a flowchart illustrating one example of an implementation for operating the vehicle anti theft system shown in FIG. 1. The method starts in step 202. In step 204, it is detected when the vehicle engine is started. When the vehicle engine is started, another process automatically runs such that the vehicle identification information is retrieved from the vehicle in step 206. This vehicle identification information is then transmitted via the mobile network 120 (FIG. 1) in step 208. In a next step 210, it is checked whether the identified vehicle 100 is registered as a stolen vehicle by comparing the vehicle identification information to the information stored in the database of the server 124 of FIG. 1. When the vehicle 100 is not registered as a stolen vehicle, the method returns to the beginning, detecting again when the engine of the vehicle is started in step 204.

If it is, however, detected in step 210 that the vehicle 100 is detected in the database of the server 124, the position of the vehicle 100 is determined in step 212. As mentioned in connection with FIG. 1, this can be either done by processing the signal received by the base station(s) 122 (FIG. 1) or by detecting the position information transmitted from a position detecting unit 116 (FIG. 1). In step 214, as an option, when it is determined that the identified vehicle 100 is comprised in the list of stolen vehicles, the position information of the vehicle 100 can be transmitted to a responsible authority. The responsible authority may be the network provider of the mobile network 120, may be the police, the insurance company of the vehicle or any other entity collecting the position data of stolen vehicles. The informed authority can then take the necessary steps and can initiate the recovery of the stolen vehicle.

In the next step 216, it is determined whether to transmit back to the vehicle 100 information that the vehicle 100 is identified as a stolen vehicle. If the information is not to be transmitted back to the vehicle 100, the method ends in step 218. In this case, no further action is taken.

All these described steps may be carried out without notice to the person responsible for the vehicle theft. When the vehicle is started, the vehicle identification information is automatically transmitted via the mobile communication unit 103 to the server 124 without notice of the person in charge of the vehicle theft. The car's snatcher does not recognize that the position information is being transmitted, so that the does not notice that the may be pursued.

Furthermore, when the information that the vehicle 100 is stolen is transmitted back to the vehicle 100, the anti theft system may continue to detect the position of the vehicle 100 in step 220 and, in step 222, transmit this position again via the mobile network 120 to the responsible authority. If no position detecting unit 116 (FIG. 1) is provided in the vehicle 100, the vehicle's position can also be determined by the network access device 102 continuing to transmit data via the mobile communication unit 103 to the mobile network 120.

According to another implementation of the invention, the functioning of the vehicle 100 may be controlled in step 224. When it is determined that the vehicle is a stolen vehicle, the mobile network 120 may transmit a signal back to the vehicle 100, and an engine control unit 118 (FIG. 1) may interrupt the functioning of the vehicle engine upon detection of the fact that the vehicle 100 is stolen. By way of example, the engine can be cut off or the supply of fuel to the engine can be stopped, the horn of the vehicle can be activated, and when a camera is comprised in the vehicle, a photo can be taken from the passenger compartment of the vehicle and can be transmitted back via the mobile network 120. It should be understood that any other reactions are possible when it is detected that the vehicle 100 is registered as a stolen vehicle. The method ends in step 226. Furthermore, it is also possible that the step 224 is omitted so that the vehicle continues transmitting data.

As described above, the position of the vehicle 100 using the anti theft system can be determined without the need to install additional anti theft hardware in the vehicle and without the need of subscriber identification. For example, in one implementation, the wireless communication system may be a mobile telephony network. The mobile communication unit 103 can be a cellular phone installed in the vehicle, however, it is also possible that the mobile communication unit 103 is a hands free system comprising a network access device 102 (FIG. 1). Such a hands free system is normally used in connection with a cell phone, the hands free system retrieving the subscriber identification information from the subscriber identification card provided in the cell phone. The data is transmitted via the network access device 102 of the hands free system.

Figure 3:
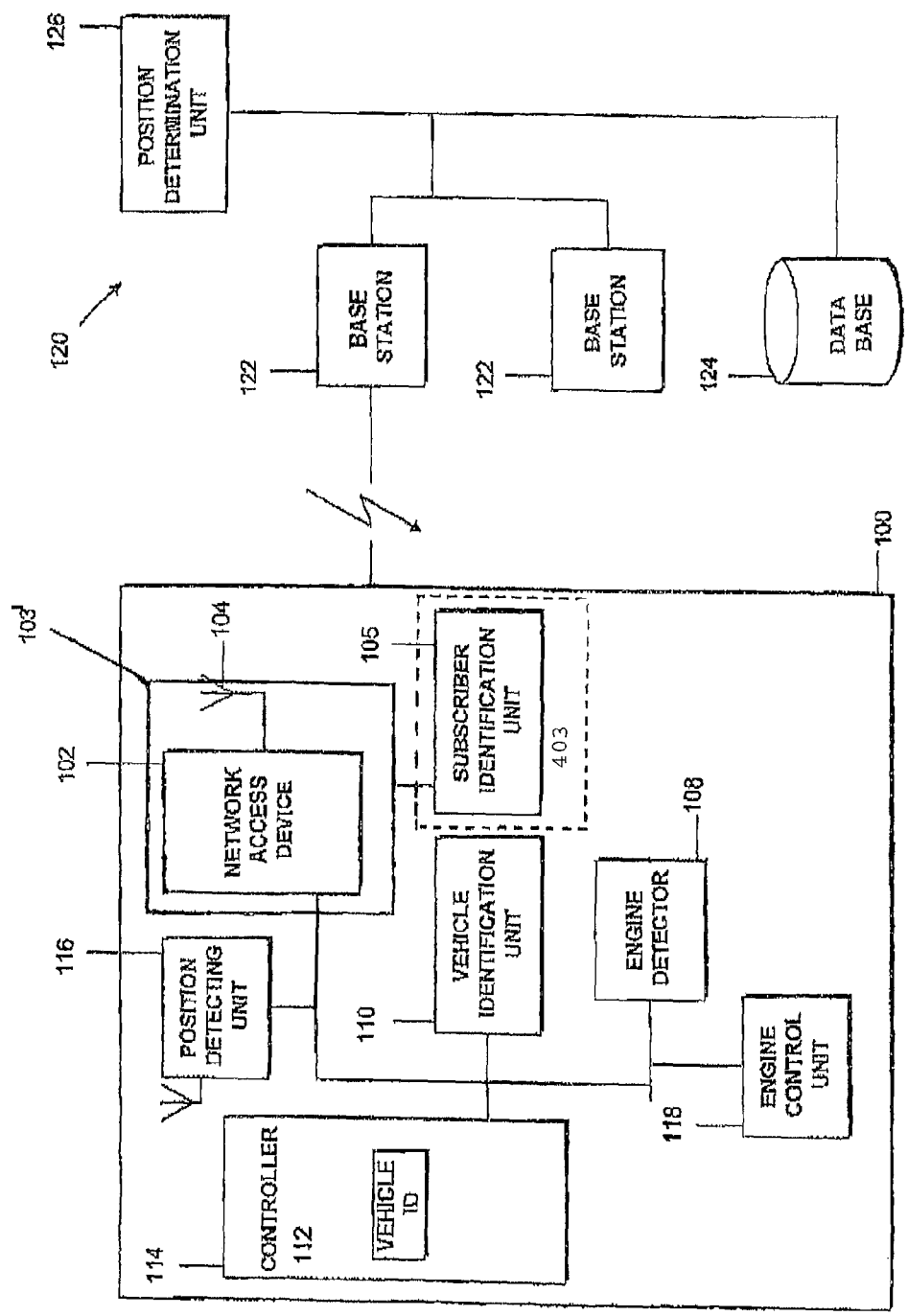
FIG. 3 is a schematic view of another example implementation of the vehicle anti-theft system.

Hands free systems are often designed in such a way that even without the use of the mobile communication unit 103 (FIG. 1), such as cell phone, a signal exchange with the mobile network 120 is possible. FIG. 3 shows the vehicle 100 of FIG. 1 with mobile communications unit 103 connected to a handsfree system 103'. Mobile communications unit 103 in FIG. 3 is a cell phone that is not normally present when the driver has left the vehicle 100 (noted by box with dashed outline). When a vehicle 100 is stolen, the authorization to use the mobile communication unit 103 in the vehicle 100 is normally not present, as normally a unit allowing the identity of the subscriber such as the subscriber identity module card (SIM card) is not present in the vehicle. However, in this example of an implementation, in the mobile network 120, a transmission mode exists, allowing the transmission of data even without the presence of such a SIM card. By way of example, an emergency call can be activated without the presence of a SIM card. Due to the fact that the SIM card is normally not present in a stolen vehicle, it is normally not possible to call the mobile communication unit 103 (cell phone) in the vehicle 100 and to retrieve in this way the information needed to determine the position of the vehicle 100. According to the invention, the transmission of vehicle identification information is initiated upon the vehicle start, this normally being a situation where the normal functioning of the mobile communication system 103 in the vehicle can normally not be assured. Nevertheless, a protocol can be started when the vehicle engine is started in which the vehicle 100 is identified and the identified information is transmitted via the mobile network 120 where it can be checked whether the vehicle is registered as a stolen vehicle.

As described above, the position of the vehicle 100 may be determined outside the vehicle 100 based on the transmitted vehicle identification signal or based on cell information of the mobile communication unit 103, e.g., cell phone. In mobile networks 120, it is possible to determine the position of a mobile communication unit 103. The signals received from the mobile communication unit 103 are received and forwarded by base stations 122 of the mobile network 120. Each base station 122 has certain coverage, so that when the signal is received by only one base station 122, the position of the vehicle 100 can be at least determined in a first approximation. When the signal from the vehicle 100 is detected by several base stations 122 of the mobile network 120, the position of the vehicle 100 can be determined with a high accuracy, as the position can be determined based on the received signal intensity and based on geometrical calculations taking into account the positions of the different base stations 122 receiving the signal.

In summary, the position detecting unit 116 may be located outside of the vehicle 100 and may determine the position of the vehicle 100 based on the cell information of the mobile network 120. In one example, the position detecting unit 116 is outside the vehicle 100 and connected to the mobile telephony or wireless communication network 120 for retrieving the data needed to determine the position from where the data was received. As explained above, it is possible to determine the position of the mobile communication unit 103 provided in the vehicle 100 based on the signal received from the mobile network 120. It should be understood that it is also possible to additionally determine the position by using a position detecting unit 116 provided in the vehicle itself, alone or as part of a navigation system.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1 & 2 may be performed by hardware and/or software. Additionally, an anti theft system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electro-magnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed is:

1. A method for identifying a stolen vehicle, the method comprising the steps of:
    detecting the start of an engine of the vehicle;
    retrieving a vehicle identification information automatically when the engine is started;
    establishing a connection from a network access device in a hands free unit to an external database of stolen vehicles,
    where, when the hands free unit is connected to a mobile communications unit operable as a cell phone, the hands free unit is configured to obtain subscriber information from the mobile communication unit, to establish a subscriber connection over a mobile telephony network utilizing the subscriber information in accordance with a mobile telephony service corresponding to the subscriber information; and
    where, when the bands free unit is not connected to the mobile communication unit in order to receive subscriber information for communicating over the mobile telephony network using subscriber information in accordance with the mobile telephony service corresponding to the subscriber information, the hands flee unit is configured to establish the connection to the external database of stolen, vehicles without the subscriber information;
    transmitting the retrieved vehicle identification information via the mobile telephony network to the external database of stolen vehicles;
    determining whether the identified vehicle is in the database of stolen vehicles.

2. The method of claim 1 further comprising the step of determining the position of the vehicle if the identified vehicle is in the database of stolen vehicles.

3. The method of claim 2, where the position of the vehicle is determined outside the vehicle based on the transmitted vehicle identification information signal.

4. The method of claim 2, where the position of the vehicle is determined based on cell information of the mobile telephony network.

5. The method of claim 2, where the position of the vehicle is determined based on a satellite radio signal.

6. The method of claim 1, further comprising the step of stopping fine vehicle fuel supply to the engine if the identified vehicle is determined to be in the list of stolen vehicles.

7. The method of claim 2, further comprising the step of transmitting the position of vehicle to a responsible authority.

8. The method of claim 1, where, if the identified vehicle is determined to be in the list of stolen vehicles, at least one of the following activities is initiated: fine vehicle engine is cut off, a horn of the vehicle is activated, a photo of a passenger compartment of the vehicle is taken.

9. A method for identifying a stolen vehicle, the method comprising the steps of:
    retrieving information relating to a vehicle identity at the start-up of the vehicle;
    establishing a connection with a server for accessing a database of stolen vehicles over a mobile telephony network initiated from a network access device in a hands free unit configured to provide subscriber communications over a mobile telephony network when connected to a mobile phone communication unit having a means for identifying the subscriber of the mobile telephony service provided by the mobile telephony network, where the connection to the server for accessing a database of stolen vehicles is established even when the means for identifying the subscriber cannot be retrieved from the mobile communication phone unit and the hands free unit is not able to connect in accordance with the mobile telephony service;
    transferring the retrieved information to the server for accessing a database of stolen vehicles;
    determining whether the vehicle is a stolen vehicle by comparing the transferred information with the database of stolen vehicles accessible by the server; and determining the position of the vehicle.

10. The method of claim 9, where the means for identifying a subscriber are a subscriber identity module card.

11. A vehicle anti theft system comprising:
    a detector detecting the start of the engine of the vehicle;
    a hands free unit having a network access device and configured to provide subscriber communications over a mobile telephony network when connected to a mobile communication unit operable as a cell phone and having subscriber identification information for mobile telephony service over the mobile telephony network, and configured to enable the transfer of vehicle identification information via the mobile telephony network even if no subscriber identification information is available and the hands free unit is not able to connect in accordance with the mobile telephony service;
    a vehicle identification unit automatically retrieving vehicle identification information when the engine is started; and
    a transmitter transmitting the vehicle identification information to an external database of stolen vehicles via the mobile telephony network.

12. The vehicle anti theft system of claim 11 further comprising a position detecting unit which, upon detecting that the vehicle is recognized as a stolen vehicle, determines the position of the vehicle.

13. The vehicle ante theft system of claim 12, where the position detecting unit is located outside the vehicle.

14. The vehicle anti theft system of claim 12, where the position detecting unit determines the position of the vehicle based on the cell information of the mobile telephony network.

15. The vehicle anti theft system of claim 11, where the database of stolen vehicles is provided on a server accessible over the mobile telephony network.

16. The vehicle anti theft system of claim 11, further comprising an engine control unit which, upon detection that the vehicle is stolen, interrupts the functioning of the vehicle engine.

17. A vehicle anti theft system comprising:
   a detector detecting the start of the engine of the vehicle;
   a vehicle identification unit automatically retrieving a vehicle identification information when the engine is started;
   a hands flee unit having a network access device and configured to provide subscriber communications over a mobile telephony network when connected to a mobile phone communication unit having subscriber identification information in accordance with a mobile telephony service corresponding to the subscriber information, and configured to enable the transfer of vehicle identification information via the mobile telephony network even if no subscriber identification information is available and the hands free unit is not able to connect in accordance with the mobile telephony service;
   a transmitter transmitting the vehicle identification information to an external database of stolen vehicles via the mobile telephony network; and
   a position detecting unit which, upon detecting that the vehicle is recognized as a stolen vehicle, determines the position of the vehicle.

* * * * *